United States Patent [19]

Nowack

[11] Patent Number: 4,874,412

[45] Date of Patent: Oct. 17, 1989

[54] PAINT SPRAY BOOTH AND FILTER THEREFOR

[75] Inventor: William C. Nowack, Twin Lakes, Wis.

[73] Assignee: Richmond Bank, Richmond, Ill.

[21] Appl. No.: 202,789

[22] Filed: Jun. 3, 1988

[51] Int. Cl.[4] ............................................. B01D 50/00
[52] U.S. Cl. ..................................... 55/385.1; 55/440;
    55/443; 55/472; 55/485; 55/DIG. 46;
    98/115.2; 118/326
[58] Field of Search ........................ 55/385.1, 442–446,
    55/440, DIG. 46, 472, 485; 98/315.2; 118/326

[56] References Cited

U.S. PATENT DOCUMENTS

| | | | |
|---|---|---|---|
| 2,976,954 | 3/1961 | Irwin | 55/442 X |
| 3,813,855 | 6/1974 | Hill et al. | 55/440 |
| 3,923,010 | 12/1975 | Chlique | 55/444 X |
| 3,932,151 | 1/1976 | Lau | 55/446 X |
| 4,237,780 | 12/1980 | Truhan | 55/DIG. 46 X |
| 4,257,783 | 3/1981 | Gutjahr et al. | 98/115.2 X |

*Primary Examiner*—Charles Hart
*Attorney, Agent, or Firm*—Burmeister, York, Palmatier, Hamby & Jones

[57] ABSTRACT

A paint spray booth with a filter and means within the spray booth to incinerate paint from the filter. A filter particularly adapted for collecting paint overspray in a paint spray booth. The filter has a plurality of members with a first portion parallel to the path of the air and paint particle flow which is to be filtered, each of the members having a second portion extending normally in a first direction from the downstream side of the first portion. The second portions of the members are spaced from each other and form openings therebetween on a plane normal to the flow of air and paint particles. Each of the members has a third portion extending from the other side of first portion and in the opposite direction from the second portion, and the third portions of the members form slots between members with areas less than the area of the downstream openings. Each of the members also having a fourth member extending perpendicularly from the end of the second member opposite the first member toward the third member, and a fifth member extending perpendicularly from the end of the third member opposite the first member and away from the first member.

23 Claims, 2 Drawing Sheets

PAINT SPRAY BOOTH AND FILTER THEREFOR

INTRODUCTION

The present invention relates to paint spray booths and to filters for use in separating paint from a flow of air which have particular utility in such spray booths.

It is conventional practice in industry to paint parts to be used in the assembly of consumer products and industrial machines. The parts are generally of metal, although they may be of other materials such as plastic, and the parts are mounted on hangers within a spray booth for painting. The spraying may either be automatic or may be done manually by a painter. In either event, only a portion of the paint spray directed toward the item being sprayed actually is captured by the item, the remainder being carried away in a flow of air.

Historically, the flow of air was passed through a vent to the ambient atmosphere. Contamination of the ambient atmosphere, however, has been found to be undesirable and is no longer permitted, and the paint must be removed from the flow of air before it can be vented to the atmosphere. The use of a filter in the exhaust air from a paint spray booth initially proved to be inefficient due to the large quantity of air which traditionally passed through the spray booth to prevent particles of paint from being deposited upon the walls of the spray booth. Recirculation of the air through a spray booth permitted adequate flow rates for the air passing through the spray booth, and any portion of that air desired could be exhausted from the spray booth and replaced by fresh air in order to maintain the ratio of solvent vapors to oxygen sufficiently low to avoid combustion. A recirculating spray booth is disclosed in U.S. Pat. No. 4,237,780 of Truhan entitled HYDROCARBON FUEL DISPOSAL SYSTEM PARTICULARLY FOR USE IN PAINT SPRAY BOOTHS.

Recirculating spray booths have utilized various types of filters, but no filter utilized to date has been entirely satisfactory. Filters consisting of a pad of fiberglass, or natural fibers have been used to collect paint particles, and after a period of time, these filters become loaded and lose efficiency. The filters must then be removed and discarded, and they become a waste disposal burden. Efforts have been made to clean such filters and to recover the paint overspray, but such processes are costly and generally result in down time. It is the object of the present invention to provide an improved filter for use in spray booths which overcomes the deficiencies of prior filters.

Efforts have been made to incinerate the overspray paint, but these efforts have resulted in the destruction of the filter itself, as in the patent to Truhan referred to above. It is an object of the present invention to incinerate the overspray paint from the filter of a spray booth without destroying the filter itself.

In prior spray booths, processing of the filter whether by chemical means, incineration, or disposal, required removal of the filter from the spray booth. Such removal requires labor and significant down time, and is a source of inefficiency. It is an object of the present invention to incinerate the filter while it remains mounted within the spray booth.

It is also an object of the present invention to provide a filter which is superior to the filters previously used to separate paint from the flow of air, such as in a spray booth. Specifically it is an object of the present invention to provide a filter using the principal of centrifugal and successive separations in which at least one separation occurs away from the opening and the overspray is collected without affecting the size of the opening and hence the air flow.

STATEMENT OF THE INVENTION

The objects of this invention are achieved by a spray booth with a filter constructed of material which is capable of withstanding incineration, and the spray booth is provided with an air circulating system utilizing a plenum chamber and a blower to circulate the air through the work chamber to carry paint overspray to the filter which separates the paint from the air flow. The filter has a plurality of elongated parallel openings which collectively form the opening for the air flow, and a plurality of paint trapping regions preceeding the opening. The paint overspray is carried with a flow of air in a stream to the filter, and the stream is broken up into a plurality of smaller flows. Each of the smaller flows is subjected to a bend by an obstruction of the filter. As a result, the heavier particles in the flow are propelled from the flow by centrifugal force and and deposited on the exposed surfaces of the filter which may be referred to as trapping areas. Each of the flows then passes through a restriction in the form of a slot which causes the velocity of the flow to increase and minimizes the deposit of paint adjacent to the slot, thus avoiding an increase in the restriction formed by the slot. Thereafter the flow is subjected to a further bend resulting in the deposit of more paint particles on the surfaces of the filter referred to as trapping areas. The flow thereafter passes through a larger opening, thus reducing the velocity of the flow. There is very little deposit of paint particles on the surfaces of the filter adjacent to the opening due to the small bend required of the flow and the fact that most of the paint overspray has been deposited in the up-stream trapping areas.

In a preferred construction, the filter has a plurality of elongated parallel members mounted in a common plane, each of the members having a first flat elongated portion parallel to the first portion of each of the other members of the filter, and second and third portions extending outwardly from the first portion in opposite directions. In a preferred construction, the second and third portions are disposed in common spaced planes perpendicular to the first portion, and a fourth portion extends outwardly from the second portion parallel to the first portion and on the opposite side of the second portion from the first portion, and a fifth portion extends from the edge of the third portion opposite the first portion parallel to the first portion and on the same side of the third portion. By positioning such members adjacent to each other, a relatively small slot is formed between the second portions of adjacent members to provide a serpentine path for the flow of air through the filter. The width of the third portions is less than the width of the second portions to provide wider slot between third portions to facilitate a reduction in the speed of the flow of air through the filter.

This construction has the effect of separating the paint spray from the air stream before the air stream reaches the opening. Paint is sticky by nature and tends to build onto a structure and attempt to close the opening in the structure through which the air flow passes. The present construction, however, causes the paint to be removed from the air flow before it reaches the opening, thereby preventing the paint from restricting air flow.

The inventor also provides a heater in the plenum chamber of the spray booth to directly heat the filter to first dry the paint on the filter and remove the hydrocarbon solvents, and thereafter to incinerate the paint from the filter.

DESCRIPTION OF THE DRAWINGS

The present invention, its further objects and advantages, will be more readily apparent from the following specification, when viewed in the light of the drawings in which.

DETAILED DESCRIPTION

Figure 1:
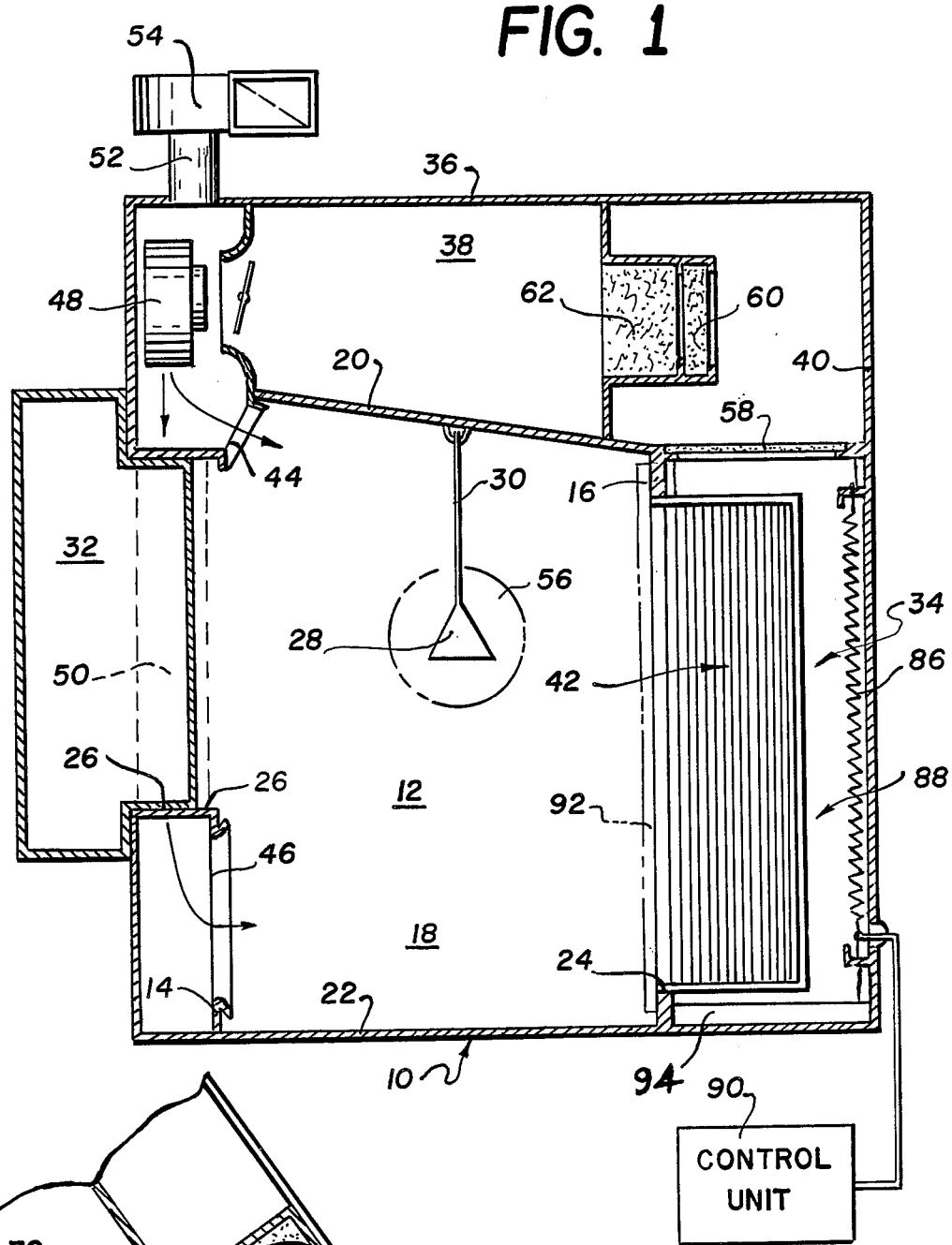
FIG. 1 is a vertical sectional view of a spray booth constructed according to the teachings of the present invention, the figure being somewhat diagramatic.

FIG. 1 illustrates a spray booth 10 with a work chamber 12 formed by a front wall 14, rear wall 16, side walls 18, top wall 20 and bottom wall 22. The work chamber has an opening 24 in the back wall 16, and an access cut-out in the front wall 14 to permit objects to be placed within the work chamber for spraying. Although not illustrated, the spray booth is provided with spraying means for automatically spraying an item designated 28 suspended on a wire 30 from the top wall 20, although the spray means may be a manually operated spray through the access opening 26. A cover 32 closes the access opening 26 when in use.

A plenum chamber 34 is formed on the side of the opening 24 opposite the work chamber 12 by a top wall 36, a portion of the bottom wall 22, side walls 38, and a rear wall 40. A filter 42 is mounted in the opening 24 in the wall 16 and the filter 42 extends into the plenum chamber 34.

The plenum chamber is also provided with apertures 44 and 46 adjacent to the front wall 14 of the work chamber to provide a flow of air into the work chamber. A blower 48 mounted adjacent to the aperture 44 directs air from the plenum chamber through the apertures 44 and 46, the aperture 46 being coupled to the blower through a duct 50. The intake side of the blower 48 is also coupled to an exhaust duct 52 which conducts a portion of the flow of air through the plenum chamber 34 through an exhaust system 54 to the ambient atmosphere, the exhaust system 54 containing a blower and filter. Approximately 30% of the air flowing through the plenum chamber 34 is exhausted through the exhaust system 54 to ambient atmosphere and 70% of the air flow is returned to the work chamber, thereby providing the desired air flow to transport the paint overpray to the filter 42 with a reduced flow of air to the ambient atmosphere. Further, by positioning the apertures 44 and 46 above and below the access opening 26 and positioning the workpiece 28 on a plane centrally of the access opening, the flow of air past the workpiece is relatively slow, the workpiece being positioned in a region designated 56 with relatively slow air flow. As a result, a larger proportion of the paint spray will fall upon and remain upon the workpiece than would occur with a high flow of air, but the paint overspray is still transported to the filter 42.

The plenum chamber is also provided with a second filter 58 extending between the junction of the wall 16 and the wall 20 and the rear wall 40 of the plenum chamber. A third filter 60 is mounted between the upper wall 36 and the wall 20 in the plenum chamber, and it is cascaded with a fourth filter 62 directly adjacent to the filter 60. The filters 58,60 and 62 will be effective to remove any paint overspray which passes the primary filter 42.

Figure 4:
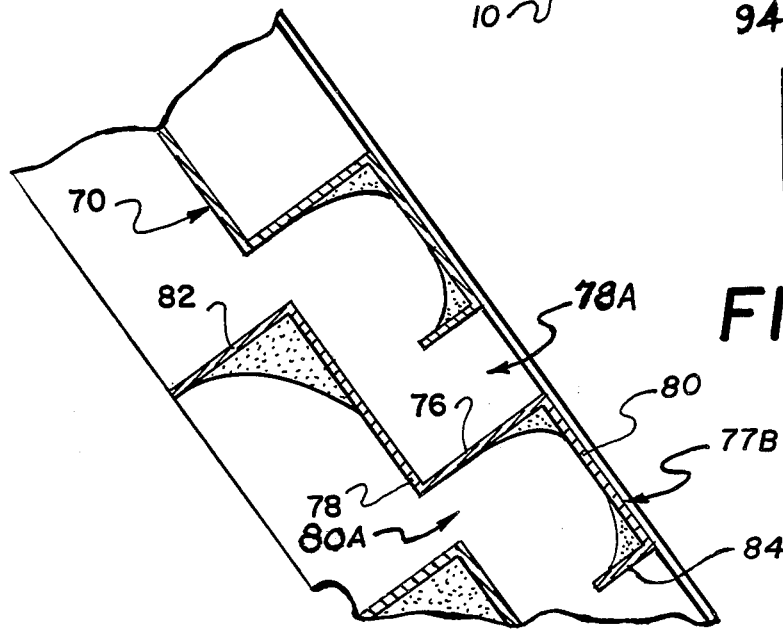
FIG. 4 is an enlarged fragmentary view of a portion of the filter illustrated in FIG. 3.
Figure 2:
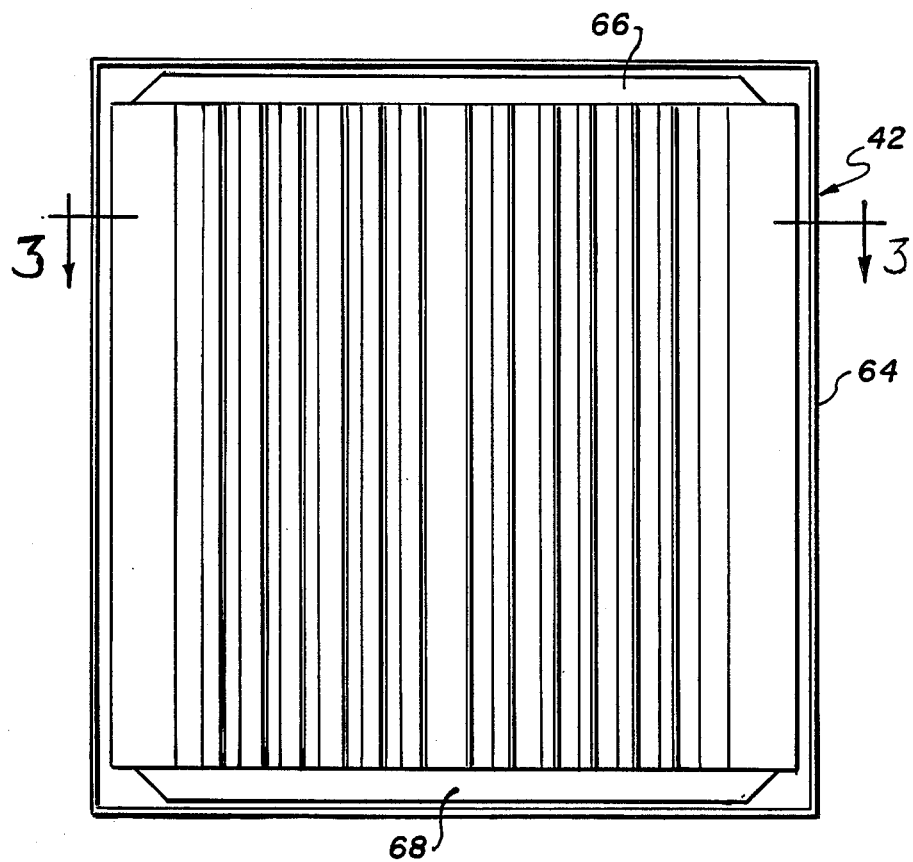
FIG. 2 is a front elevational view of the filter employed in the spray booth of FIG. 1.
Figure 3:
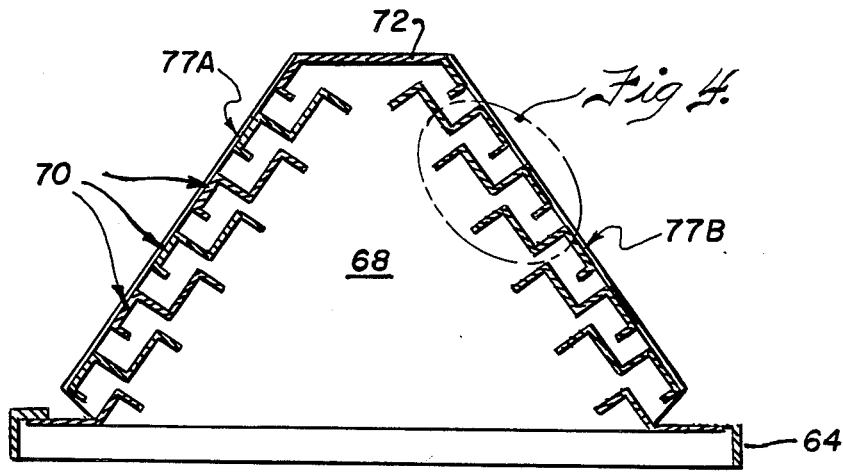
FIG. 3 is a sectional view taken along the line 3—3 of FIG. 2.

The filter 42 is illustrated in detail in FIGS. 2 through 4. It has a rectangular frame 64, which is sealed within the opening 24, and a triangular top plate 66 and a triangular bottom plate 68 which extend back from the frame 64. A plurality of members 70 are mounted at their ends on the top plate 66 and bottom plate 68, and the members 70 are positioned adjacent to each other to form two filters on two planes which intersect at a junction plate 72.

The members 70 are best illustrated in FIGS. 3 and 4, and it will be noted that the members have a first rectangular flat portion 76 which is disposed perpendicular to the plane of the filter. FIG. 3 illustrats two filters 77A and 77B in a common opening disposed at an angle of approximately 90 degrees to each other to provide a larger filtering surface and to require the paint overspray to bend through an angle in excess of 90 degrees. The first portion 76 of the member 70 is disposed between a second portion 78 and a third portion 80. The second and third portions 78 and 80 are also flat and elongated. A flat elongated fourth portion 82 extends from the edge of the second portion 80 opposite the first portion 76, and a fifth elongated flat portion 84 extends from the edge of the third portion 80 opposite the first portion 76.

The second portion 78 of each of the members 70 is disposed in a common plane in each of the filters, and the third portion 80 of each of the members is disposed in a second common plane spaced from the first common plane, the common planes being perpendicular o the first portions 76 of the members. In each of the common planes, the distances between the edges of the second portions 78 is shorter than the distances between the edges of the third portions 80, and, therefore, the slot 80A formed by the members between the third portions of adjacent members is narrower than the elongated opening 78A between second portions of adjacent members.

FIG. 4 illustrates the path for a single portion or flow of the stream of air and paint overspray. One paint buildup from the overspray occurs between the third and fifth portions of each member and this deposit is believed to result from the bend in the flow causing centrifugal force to propel the paint particles. It will be noted that there is very little paint build-up on the surfaces of the filter adjacent to the slot 80A and this fact is believed to result from the velocity of the flow in this region and the absence of an obstruction requiring a bend in the flow. Another paint buildup occurs between the first and second portions of the member and between the second and forth portions of the member and these deposits are believed to result from bending the accelerated flow and the resulting centrifugal force. There are very little deposits adjacent to the elongated opening 78A, and these deposits are reduced by the reduction in air velocity in proximity with the opening.

In a preferred construction of a filter according to this invention, the first portion measured one inch between edges, that is perpendicular to the longitudinal axis of the portion of the member. Similarly measured between edges, the second portion measured one and one-fourth inches, the third portion measured one and one-half inches, the fourth portion measured one-half inch and the fifth portion measured one inch. The portions of the members are interconnected by right angle bends to form single integral units, and are fabricated of 18 gauge sheet steel. The elongated opening 78A formed between the second portions 78 of adjacent members is approximately three-fourths inch wide, and the slot 80A formed between the third portions 80 of adjacent members is approximately one-half inch wide.

After prolonged use, the paint buildup illustrated at 80 and 82 of FIG. 4 reduces the effectiveness of the filter, and the filter must be cleaned. According to the present invention the filter is first heated to drive off the paint solvents and cure the paint on the filter before the paint can be incinerated from the filter. To carry out this process, the filter may be removed from the opening 24 in the wall 16 and transported to a curing oven. In the oven, the filter with trapped paint is subjected to a temperature between 250 and 500 degrees Fahrenheit for a period sufficient to drive the solvent from the paint on the filter. In practice, a temperature of 350 degrees for a period of ten minutes is sufficient to remove the conventional hydrocarbons used in paint. Thereafter, the filter and cured paint is subjected to a temperature of 700 to 1500 degrees Fahrenheit to incinerate the paint and the temperature is maintained for a sufficient period to cause the paint to disintegrate and fall from the filter as flakes. In some cases, the filter is tapped to facilitate dropping of the flakes. These flakes are readily collected and may be disposed of or reclaimed. In practice, the period required at elevated temperature to produce disintegration varies with the paint involved, but generally is of the order of three hours at 1200 degrees Fahrenheit.

FIG. 1 includes apparatus for curing the paint on the filter and incinerating the cured paint located within the spray booth. An electrical heater 86 with a plurality of electrical heating elements, only one of which is illustrated, is mounted on the rear wall 40 of the plenum chamber 34 confronting the filter 42. The portion of the plenum chamber 34 in which the filter 42 is located, designated 88, is constructed to withstand temperatures up to 1500 degrees Fahrenheit, including the second filter 58 which is a porous ceramic element. The electrical heater 86 is electrically connected to a control unit 90 which controls both the temperature within the portion 88 of the plenum chamber 34 but also the duration of the temperature cycles. FIG. 1 also illustrates in phantom lines a slightly porous cover 92 mounted on the wall 16 and covering the opening 24. The cover 92 is to restrict air circulation through the opening 24, and retain heat in the portion 88 of the plenum chamber 34. The cover may be contructed of ceramic fiber thermal insulation material. The walls 22, 24, and 40 are also lined with a layer 94 of ceramic fiber thermal insulation material.

The paint laden filter 42 may be cleaned without removing the filter from the spray booth by mounting the cover 92 in position over the opening 24, actuating the exhaust system and blower, and actuating the control unit. The control unit will actuate the electrical heater 86 and control the temperature of the portion 88 of the plenum to maintain a temperature in the range of 250 to 500 degrees Fahrenheit for a set period of time which has been determined to be sufficient to evaporate the solvent from the paint. Thereafter, the control unit will elevate the temperature to the range of 800 to 1500 degrees Fahrenheit and maintain that temperature for the period of time that has been determined to be sufficient to incinerate the cured paint and release it from the members of the filter. The exhaust system continues to function to remove solvent vapors and combustion fumes from the plenum chamber and work chamber. All that remains to be done on completion of the incineration cycle and cooling is to remove the cover 92 from the opening and to remove the flakes of incinerated paint from the portion 88 of the plenum chamber.

There are significant economic advantages to a spray booth constructed according to the present invention. The need for replacement filters is greatly reduced, since the filter 42 need not be replaced when it is fully loaded with paint overspray. The filter 42 does not produce the air pressure drop of conventional filters, thereby reducing energy requirements and making possible a less costly blower 48. The filter 42 will collect many times the paint of a conventional filter, thus reducing downtime. Further, the filter may be cleaned in place during normal downtime periods, thus increasing production and reducing production costs. In addition, the cost of disposal of the waste paint is materially reduced.

Those skilled in the art will recognize many advantages for the present invention and will devise many structures within the contemplation of this invention. It is therefore intended that the scope of this invention be not limited by the preceding specification, but rather only by the appended claims.

The invention claimed is:

1. A paint spray booth comprising a first wall means defining a work chamber adapted to receive objects to be painted and a second wall means adjacent to the first wall means defining a plenum chamber, said first wall means having an opening communicating with the plenum chamber and an aperture spaced from the opening communicating with the plenum chamber, said second wall means having an orifice communicating with the ambient atmosphere, a filter sealed in the opening, air circulation means in the plenum chamber for moving air through the filter into the plenum chamber, through the plenum chamber, dividing the flow of air to direct a portion thereof through the aperture back into the work chamber and a portion thereof through the orifice to the ambient atmosphere, wherein the filter is disposed in a plane and comprises a plurality of elongated members, each of said members having a first flat elongated portion with opposite edges and the axes of the first portions of the members being disposed parallel to each other in a common plane, each of said members having a second and a third flat portion extending from opposite edges of the first portion, the second portions being disposed in a second common plane parallel to the common plane of the axes of the first portions and spaced from each other to form openings therebetween for the passage of air, the third flat portions being spaced from each other and forming slots therebetween for the passage of air, the third portions directly confronting the work chamber and each slot having an area less than the area of the downstream opening, whereby air directed toward the filter passes through the slots and thereafter the openings.

2. A paint spray booth comprising the combination of claim 1 wherein the filter comprises a fourth flat elongated portion disposed in a plane parallel to and spaced from the first portion, said fourth portion extending outwardly from the second portion in the same direction as the first portion.

3. A paint spray booth comprising the combination of claim 1 comprising a fifth flat elongated portion disposed in a plane parallel to and spaced from the first portion, said fifth portion extending outwardly from the third portion in the opposite direction as the first portion.

4. A paint spray booth comprising the combination of claim 1 wherein the third portion of the members are disposed in a third common plane parallel to and spaced from the first common plane.

5. A paint spray booth comprising the combination of claim 4 wherein at least two filters are sealed within the opening, the first common plane of one filter being disposed at an angle to the first common plane of the other filter.

6. A paint spray booth comprising the combination of claim 3 wherein the fourth portion of each member is disposed in a plane normal to the first common plane and the plane of the fourth portion of one member is disposed between the planes of the first and fifth portions of the adjacent member.

7. A paint spray booth comprising the combination of claim 6 wherein the plane of the fourth portion of the one member is spaced from the plane of the first portion of the adjacent member by a distance less than ¾ inch.

8. A paint spray booth comprising the combination of claim 6 wherein the first, second, third, fourth and fifth portions of each of its members are rectangular with edges parallel to the axes of elongation thereof, the second and third portions extending in opposite directions from opposite edges of the first portion, the fourth portion extending from the edge of the second portion opposite the first portion and the fifth portion extending from the edge of the third portion opposite the first portion.

9. A paint spray booth comprising the combination of claim 8 wherein the distance between the edges of the first portion is approximately one inch, the distance between the edges of the second portion is approximately 1½ inch, the distance between the edges of the third portion is approximately 1¼ inch.

10. A paint spray booth comprising the combination of claim 1 wherein the filter is constructed of material maintaining its shape and composition at temperatures in excess of 1000° F.

11. A paint spray booth comprising the combination of claim 10 in combination with means disposed within the spray booth for heating the filter to temperatures within two ranges of temperatures, said heating means including control means for first heating the filter to a temperature in the range between 250° F. and 500° F. for a period of time sufficient to vaporize the solvent of paint collected on the filter and thereafter heating the filter to a temperature in a second range of temperature between 700° F. and the softening temperature of the material of the filter members for a period of time sufficient to incinerate the paint on the filter.

12. A filter adapted to remove paint from a flow of air comprising, in combination, a plurality of elongated members, each of said members having a first flat elongated portion with opposite edges and the axes of the first portions of the members being disposed parallel to each other in a common plane, each of said members having a second and a third flat portion extending from opposite edges of the first portion, the second portions being disposed in a second common plane parallel to the common plane of the axes of the first portion and spaced from each other to form openings therebetween for the passage of air, the third flat portions being spaced from each other and forming slots therebetween for the passage of air, the area of each slot being less than the area of the downstream opening, whereby air directed toward the third portions of the members passes through the slots between the third portions and thereafter the openings between the second portions.

13. A filter adapted to remove paint from a flow of air comprising, in combination of claim 12 wherein the flat first portion is disposed in a plane normal to the plane of the axes of the first first portions and the second and third portions are disposed normal to the first portion.

14. A filter adapted to remove paint from a flow of air comprising, in combination of claim 13 wherein the distance between the third portions is less than the distance between the second portions to provide a restriction in the flow of air before the openings.

15. A filter adapted to remove paint from a flow of air comprising the combination of claim 13 wherein the filter comprises a fourth flat elongated portion disposed in a plane parallel to and spaced from the first portion, said fourth portion extending outwardly from the third portion in the opposite direction from the first portion.

16. A filter adapted to remove paint from a flow of air comprising the combination of claim 13 comprising a fifth flat elongated portion disposed in the plane parallel to and spaced from the first portion, said fifth portion extending outwardly from the second portion in the same direction as the first portion a distance less than the distance between the planes of the second and third portions.

17. A filter adapted to remove paint from a flow of air comprising the combination of claim 13 wherein the third portion of the members are disposed in a third common plane spaced from the first common plane.

18. A filter adapted to remove paint from a flow of air comprising the combination of claim 17 wherein at least two filters are mounted together in side-by-side relation, the first common plane of one filter being disposed at an angle to the first common plane of the other filter.

19. A filter adapted to remove paint from a flow of air comprising the combination of claim 17 wherein the plane of the fourth portion of one member is disposed between the planes of the first and fifth portions of the adjacent member.

20. A filter adapted to remove paint from a flow of air comprising the combination of claim 19 wherein the plane of the fourth portion of the one member is spaced from the plane of the first portion of the adjacent member by a distance of less than ¾ inch.

21. A filter adapted to remove paint from a flow of air comprising the combination of claim 20 wherein the first, second, third, fourth and fifth portions of each of the members are rectangular with the edges parallel to the axes of elongation thereof, the second and third portions extending in opposite directions from opposite edges of the first portion, the fourth portion extending from the edge of the second portion opposite the first portion and the fifth portion extending from the edge of the third portion opposite the first portion.

22. A filter adapted to remove paint from a flow of air comprising the combination of claim 21 wherein the distance between the edges of the first portion is approximately 1 inch, the distance between the edges of the second portion is approximately 1½ inch, the distance between the edges of the third portion is approximately 1¼ inch.

23. A filter adapted to remove paint from a flow of air comprising the combination of claim 12 wherein the filter is constructed at temperatures in excess of 1000° F.

* * * * *